US012608068B2

(12) United States Patent
Wu et al.

(10) Patent No.: US 12,608,068 B2
(45) Date of Patent: Apr. 21, 2026

(54) MOBILE TERMINAL AND POWER CONSUMPTION DETECTION METHOD OF MOBILE TERMINAL

(71) Applicant: SAMSUNG ELECTRONICS CO., LTD., Suwon-si (KR)

(72) Inventors: Huiling Wu, Jiangsu Province (CN); Yong Peng, Jiangsu Province (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 18 days.

(21) Appl. No.: 18/611,246

(22) Filed: Mar. 20, 2024

(65) Prior Publication Data

US 2024/0319776 A1 Sep. 26, 2024

(30) Foreign Application Priority Data

Mar. 24, 2023 (CN) .......................... 202310301316.3

(51) Int. Cl.
*G06F 1/26* (2006.01)
*G06F 1/28* (2006.01)
*G06F 1/3218* (2019.01)
*G06F 1/3203* (2019.01)
*G06F 1/3287* (2019.01)

(52) U.S. Cl.
CPC .............. *G06F 1/3218* (2013.01); *G06F 1/28* (2013.01); *G06F 1/3203* (2013.01); *G06F 1/3287* (2013.01)

(58) Field of Classification Search
CPC ........ G06F 1/3218; G06F 1/28; G01R 21/133
USPC ........................................................ 713/320
See application file for complete search history.

(56) References Cited

U.S. PATENT DOCUMENTS

| | | | |
|---|---|---|---|
| 9,696,353 B2 | 7/2017 | Hanssen et al. | |
| 10,719,110 B2 | 7/2020 | Sliech | |
| 2010/0204934 A1* | 8/2010 | Gotou .............. | G01R 31/31721 |
| | | | 702/120 |
| 2012/0101652 A1* | 4/2012 | Shin .......................... | H02J 3/14 |
| | | | 700/296 |
| 2012/0197448 A1* | 8/2012 | Shin ....................... | G06Q 10/06 |
| | | | 700/286 |

(Continued)

FOREIGN PATENT DOCUMENTS

| | | |
|---|---|---|
| CN | 102590609 A | 7/2012 |
| CN | 103777067 A | 5/2014 |

(Continued)

OTHER PUBLICATIONS

Communication issued Sep. 29, 2025 by the China National Intellectual Property Administration in Chinese Patent Application No. 2025092902263200.

*Primary Examiner* — Volvick Derose
(74) *Attorney, Agent, or Firm* — Sughrue Mion, PLLC

(57) ABSTRACT

Disclosed are a mobile terminal and a power consumption detection method of the mobile terminal, the mobile terminal including: a power consumption measurement circuit; an application processor configured to transmit a detection command for detecting power consumption data respectively corresponding to at least one hardware module of a plurality of hardware modules of the mobile terminal; and a microprocessor configured to acquire the power consumption data corresponding to the at least one hardware module through the power consumption measurement circuit, based on the detection command received from the application processor.

18 Claims, 6 Drawing Sheets

100

120

110

MPU

AP

130

Power consumption measurement circuit

(56)                References Cited

U.S. PATENT DOCUMENTS

| | | | |
|---|---|---|---|
| 2015/0028898 A1* | 1/2015 | Hanssen | G01R 21/06 |
| | | | 324/705 |
| 2016/0070632 A1 | 3/2016 | Kim et al. | |
| 2016/0169948 A1* | 6/2016 | Thielen | H04W 52/0251 |
| | | | 702/61 |
| 2017/0108351 A1* | 4/2017 | Shimizu | H04Q 9/00 |
| 2019/0050035 A1* | 2/2019 | Sliech | G06F 1/26 |
| 2019/0163250 A1* | 5/2019 | Lee | G06F 11/3062 |
| 2025/0190199 A1* | 6/2025 | Scott | G06F 8/61 |

FOREIGN PATENT DOCUMENTS

| | | |
|---|---|---|
| CN | 104077211 B | 11/2018 |
| CN | 111427757 A | 7/2020 |
| CN | 110225167 B | 8/2021 |

* cited by examiner

FIG. 3

MOBILE TERMINAL AND POWER CONSUMPTION DETECTION METHOD OF MOBILE TERMINAL

CROSS-REFERENCE TO RELATED APPLICATIONS

This application is based on and claims priority under 35 U.S.C. § 119 to Chinese Patent Application No. 202310301316.3, filed on Mar. 24, 2023, in the China National Intellectual Property Administration, the disclosure of which is incorporated by reference herein in its entirety.

BACKGROUND

1. Field

The disclosure relates to a power consumption test circuit and a method of performing a power consumption test, and more specifically, to a mobile terminal having a power consumption measurement circuit, and a method of performing a power consumption test in the mobile terminal.

2. Description of Related Art

With continuous optimization of performance of a mobile terminal, an issue about power consumption is extremely important. Generally, an external power consumption measurement apparatus is used to measure the power consumption of the mobile terminal. However, it is not convenient for the external power consumption measurement apparatus to measure the power consumption of a large number of mobile terminals at the same time, nor to measure the power consumption of the mobile terminals at different places.

Therefore, a technique to measure the power consumption of the mobile terminal conveniently is required.

SUMMARY

According to an aspect of the disclosure, there is provided a mobile terminal, including: a power consumption measurement circuit configured to measure power consumption of one or more hardware modules, among a plurality of hardware modules of the mobile terminal; an application processor configured to transmit a detection command for detecting power consumption of a first hardware module, among the plurality of hardware modules; and a microprocessor configured to obtain first power consumption data corresponding to the first hardware module from the power consumption measurement circuit, based on the detection command received from the application processor.

According to another aspect of the disclosure, there is provided a power consumption detection method of a mobile terminal, the mobile terminal comprising an application processor, a microprocessor and a power consumption measurement circuit, the power consumption detection method including: transmitting, by the application processor, a detection command for detecting power consumption of a first hardware module of a plurality of hardware modules of the mobile terminal; and obtaining, by the microprocessor, first power consumption data corresponding to the first hardware module from the power consumption measurement circuit, based on the detection command received from the application processor.

Other aspects and/or advantages of the disclosure will be partially described in the following description, and part will be clear through the description or may be learn through the practice of various example embodiments.

BRIEF DESCRIPTION OF DRAWINGS

The above and other objects, features and advantages of the disclosure will become clearer through the following detailed description together with the accompanying drawings in which:

FIG. 3 is a block diagram showing a power consumption measurement circuit according to an example embodiment of the disclosure.

DETAILED DESCRIPTION

Figure 1:
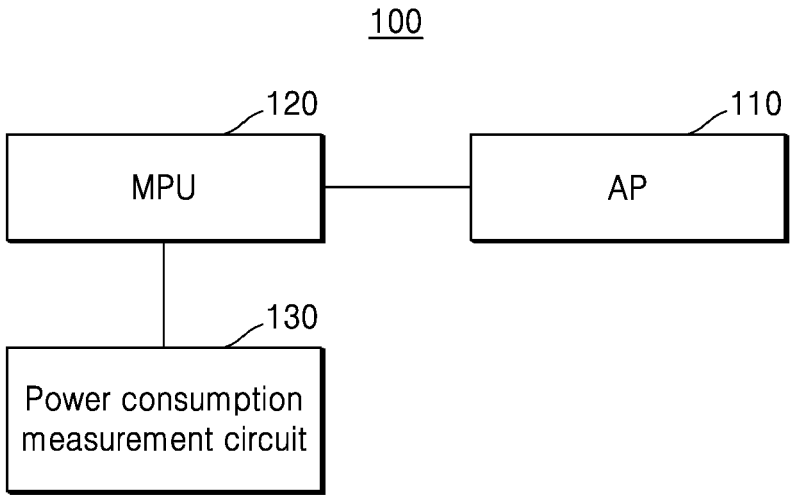
FIG. 1 is a block diagram showing a mobile terminal according to an example embodiment of the disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions of examples disclosed in the disclosure are merely intended for the purpose of describing the examples and the examples may be implemented in various forms. The examples are not meant to be limited, but it is intended that various modifications, equivalents, and alternatives are also covered within the scope of the claims.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the disclosure.

It will be understood that when a component is referred to as being "connected to" another component, the component can be directly connected or coupled to the other component or intervening components may be present.

As used herein, the singular forms "a", "an", and "the" are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof. As used herein, expressions such as "at least one of" when preceding a list of elements, modify the entire list of elements and do not modify the individual elements of the list. For example, the expression, "at least one of a, b, and c" should be understood as including only a, only b, only c, both a and b, both a and c, both b and c, or all of a, b, and c.

Unless otherwise defined, all terms including technical or scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, examples will be described in detail with reference to the accompanying drawings. Regarding the reference numerals assigned to the elements in the drawings, it should be noted that the same elements will be designated by the same reference numerals, and redundant descriptions thereof will be omitted.

FIG. 1 is a block diagram showing a mobile terminal according to an example embodiment of the disclosure.

The mobile terminal according to various example embodiments of the disclosure may be, for example, a mobile phone, a tablet personal computer (PC), a laptop computer, etc. However, the disclosure is not limited thereto.

Referring to FIG. 1, the mobile terminal 100 according to an example embodiment of the disclosure may include an application processor (AP) 110, a microprocessor (MPU) 120, and a power consumption measurement circuit 130.

The AP 110 may transmit, a detection command for detecting power consumption data corresponding to at least one hardware module of a plurality of hardware modules of the mobile terminal, to the MPU 120. Here, a hardware module of the mobile terminal may be a hardware circuit configured to perform a specific function of the mobile terminal. For example, the hardware circuit may be a circuit for capturing an image (i.e., photography function). However, the disclosure is not limited thereto, and as such, according to another example embodiment, the hardware circuit may be a circuit configured to perform various other functions of the mobile terminal.

For example, the AP 110 may generate the detection command according to commands of a user or preset parameters. The commands of the user may be input to the mobile terminal 100 through a type of input through an input interface. For example, the commands may be input including, but is not limited to, a touch input, a keyboard input, a voice input, a gesture input, etc.. The input interface may include, but is not limited to, a touch screen, a keyboard, a microphone, a gesture sensor, etc.

According to an example embodiment, the preset parameters may be stored in the mobile terminal. For example, the preset parameters may be stored in advance in a memory in the mobile terminal 100. For example, the preset parameters may include information related to the hardware module to be detected, a time to start detection of the power consumption data, a scene in which the power consumption data is detected, a frequency at which the power consumption data is detected, a duration during which the power consumption data is detected. However, the disclosure is not limited thereto, and as, according another example embodiment, the preset parameters may include other information related to the hardware module to be detected or other criteria related to the detection of the power consumption data.

According to an example embodiment, the detection command may include parameters for detecting the power consumption data, for example, but not limited to, the information related to the hardware module to be detected, the scene in which the power consumption data is detected, the frequency at which the power consumption data is detected, the duration during which the power consumption data is detected. However, the disclosure is not limited thereto, and as, according another example embodiment, the detection command may include other parameters related to the hardware module to be detected or other criteria related to the detection of the power consumption data. According to an example embodiment, the scene in which the power consumption data is detected may include a mode or state of the mobile terminal. For example, the scene in which the power consumption data is detected may be an idle mode, a sleep mode, an operation mode.

According to one or more example embodiments, when the detection command does not include the duration or when the detection command includes the duration set as 0, the AP 110 may generate a stop command for stopping detecting the power consumption data according to the commands of the user or the preset parameters, and the MPU 120 may stop detecting the power consumption data according to the stop command received from the AP 110. When the detection command includes the duration set as a non-zero value (or time), the MPU 120 automatically stops the detection after detecting the power consumption data for the duration. That is, when the duration time set in the detection command expires, the MPU 120 automatically stops detecting the power consumption data of the mobile terminal 100.

According to one or more example embodiments, the AP 110 may generate the detection command or the stop command according to the commands of the user or the preset parameters. According to one or more example embodiments, the AP 110 may receive the power consumption data from the MPU 120 and transmit the power consumption data to an external device outside the mobile terminal. According to an example embodiment, the external device may be a memory, a server, other mobile terminals, etc. outside the mobile terminal. For example, the memory outside the mobile terminal may be non-volatile memory (such as UFS memory card, compact flash (CF) memory card, secure digital (SD) memory card, micro secure digital (micro-SD) memory card, mini secure digital (mini-SD) memory card, extreme digital (xD) memory card, memory stick, etc.). However, the disclosure is not limited thereto, and as such, the external device may include other devices.

The MPU 120 may acquire the power consumption data corresponding to the at least one hardware module through the power consumption measurement circuit 130, based on the detection command received from the AP 110. In addition, the MPU 120 may transmit the power consumption data to the memory outside the mobile terminal through the AP 110.

In an example embodiment, the AP 110 and the MPU 120 are independent processors.

The MPU 120 may include a memory for temporarily storing the power consumption data. In an example embodiment, the memory of the MPU 120 may be volatile memory (such as static random access memory (SRAM), dynamic random access memory (DRAM), etc.) or non-volatile memory. The MPU 120 will be described in detail below with reference to FIG. 2.

The power consumption measurement circuit 130 may measure the power consumption data corresponding to the at least one hardware module respectively.

According to one or more example embodiments, the power consumption measurement circuit 130 may include a plurality of resistors, at least one multiplexer (MUX), and at least one analog to digital converter (ADC).

Each resistor may be connected to a corresponding hardware module of the plurality of hardware modules. For example, each resistor may be connected in series between a power supply for supplying power to the corresponding hardware module and a power interface of the corresponding hardware module.

The at least one MUX may be connected to the plurality of resistors.

The at least one ADC may be connected to the at least one MUX respectively. The at least one ADC may detect voltage data corresponding to at least one resistor, connected to the at least one hardware module, among the plurality of resistors. Here, voltage data corresponding to a resistor may include a first voltage difference between a first terminal and a second terminal of the resistor and a second voltage difference between the first terminal of the resistor and a ground terminal. Here, the first terminal of the resistor indicates a terminal, at which a voltage is higher, of the two terminals of the resistor, and the second terminal of the resistor indicates a terminal, at which a voltage is lower, of the two terminals of the resistor. The power consumption measurement circuit 130 will be described in detail below with reference to FIG. 3.

For example, the MPU 120 may transmit, voltage data corresponding to a resistor connected to a hardware module as power consumption data corresponding to the hardware module, to outside of the mobile terminal through the AP 110. In another example, the MPU 120 may calculate a power value as the power consumption data corresponding to the hardware module based on the voltage data corresponding to the resistor connected to the hardware module and a resistance value of the resistor connected to the hardware module, and transmit the power consumption data to the memory outside the mobile terminal through the AP 110. In one example, a value of a current flowing through the hardware module may be calculated by the first voltage difference and the resistance value of the resistor, and the power value may be calculated based on the obtained value of the current and the second voltage difference. According to an example embodiment, the value of the current flowing through the hardware module may be a ratio of the first voltage difference to the resistance value, and the power value may be a product of the value of the current and the second voltage difference.

In another example embodiment, the mobile terminal 100 may further include a communication module, an input interface, and a memory.

The communication module may be used for wired or wireless communication with the outside to transmit the power consumption data to outside of the mobile terminal. The communication module may be implemented by hardware elements, such as a communication circuitry. The communication module may communicate by various wireless communication protocols (such as, but not limited to, Code Division Multiple Access (CDMA), Global System for Mobile Communications (GSM), North American Digital Communications (NADC), Extended Time Division Multiple Access (E-TDMA), Wideband CDMA (WCDMA), CDMA2000, Wi-Fi, Municipal Wi-Fi (Muni Wi-Fi), Bluetooth, Digital Enhanced Cordless Telecommunications (DECT), Wireless Universal Serial Bus (Wireless USB), Fast low-latency access with seamless handoff Orthogonal Frequency Division Multiplexing (Flash-OFDM), IEEE 802.20, General Packet Radio Service (GPRS), iBurst, Wireless Broadband (WiBro), WiMAX, WiMAX-Advanced, Universal Mobile Telecommunication Service—Time Division Duplex (UMTS-TDD), High Speed Packet Access (HSPA), Evolution Data Optimized (EVDO), Long Term Evolution—Advanced (LTE-Advanced), Multichannel Multipoint Distribution Service (MMDS), Fifth-Generation Wireless (5G), Sixth-Generation Wireless (6G), and so forth) or wired communication protocols (such as, but not limited to, High Definition Multimedia Interface (HDMI), advanced technology attachment (ATA), serial ATA (SATA), external SATA (e-SATA), small computer system interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an embedded multi-media card (eMMC) interface, a UFS interface, an embedded UFS (eUFS) interface, and a compact flash (CF) card interface, and so forth).

The input interface is configured to receive various input information and various control signals, and transmit the input information and control signals to the AP 110. The input interface may be realized by various input devices such as touch screens, a keyboard, a microphone, a gesture sensor, etc; however, the example embodiment is not limited thereto.

The memory may include volatile memory and/or non-volatile memory. The memory may store various data generated and used by the mobile terminal. For example, the memory may store an operating system and application programs for controlling the operation of the mobile terminal. The AP 110 may control the overall operation of the mobile terminal and may control part or all of the internal elements of the mobile terminal. The AP 110 may be further replaced with a general-purpose processor, an application specific integrated circuit, a field programmable gate array, etc., but the example embodiment is not limited thereto.

Figure 2:
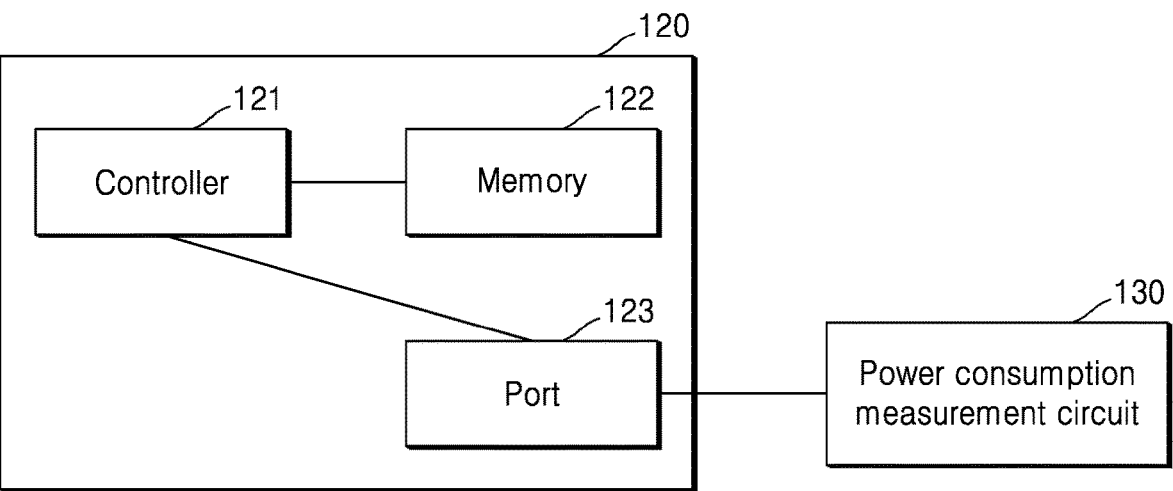
FIG. 2 is a block diagram showing a microprocessor according to an example embodiment of the disclosure.

FIG. 2 is a block diagram showing a microprocessor according to an example embodiment of the disclosure.

Referring to FIG. 2, the microprocessor 120 may include a controller 121, a memory 122, and an input/output (I/O) port 123.

The microprocessor 120 may acquire the power consumption data through the power consumption measurement circuit 130 based on the detection command received from the AP 110, and stop detecting the power consumption data. Alternatively, the microprocessor 120 may acquire the power consumption data through the power consumption measurement circuit 130 based on the detection command received from the AP 110, and stop detecting the power consumption data based on the stop command received from the AP 110.

According to one or more example embodiments, the controller 121 may transmit data to or receive data from the power consumption measurement circuit 130 through the I/O port 123. For example, the I/O port may be a serial port that supports an 12C protocol. However, the example embodiments are not limited thereto, and the I/O port may also be a port that supports other protocols.

According to one or more example embodiments, the controller 121 may control the power consumption measurement circuit 130 to acquire the power consumption data in a scene indicated by the detection command through the I/O port 123. For example, the controller 121 may control the power consumption measurement circuit 130 to acquire the power consumption data in a sleep mode. The controller 121 may control the power consumption measuring circuit 130 to acquire the power consumption data through the I/O port 123, according to a frequency parameter included in the detection command. The controller 121 may control the power consumption measurement circuit 130 to acquire the power consumption data through the I/O port 123, according to a duration included in the detection command. For example, when the detection command includes the duration set as a non-zero value (or time), the controller 121 may control the power consumption measurement circuit 130 to acquire the power consumption data for the duration through the I/O port 123. In another example, when the detection command does not include the duration or when the detection command includes the duration set as 0, the controller 121 controls the power consumption measurement circuit 130 to stop acquiring the power consumption data through the I/O port 123 according to the stop command transmitted from the AP 110.

According to one or more example embodiments, the controller 121 may temporarily store the acquired power consumption data in the memory 122. For example, the power consumption data may be stored in a circular buffer.

In an example embodiment, when a size of the power consumption data stored in the memory 122 is greater than a first threshold, the controller 121 may transmit a transmission command to the AP 110. According to an example embodiment, the first threshold may be a predetermined percentage (such as 80%) of memory capacity of memory.

In another example embodiment, when the stop command is received from the AP 110, the controller 121 transmits the transmission command to the AP 110.

According to one or more example embodiments, when the controller 121 is acquiring the power consumption data, when the AP 110 enters the sleep mode, the controller 121 may continue to acquire the power consumption data. In this case, when the remaining storage capacity of the memory 122 is less than a second threshold, the controller 121 may wake up the AP 110 and transmit the transmission command to the AP 110. The second threshold may be a predetermined percentage of the memory capacity of the memory.

According to one or more example embodiments, the AP 110 may transmit the power consumption data stored in the memory to the memory outside the mobile terminal in response to the transmission command.

Hereinafter, an example embodiment of the microprocessor 120 acquiring power consumption data through the power consumption measurement circuit 130 will be described in detail with reference to FIGS. 3 and 5.

According to one or more example embodiments of the disclosure, the power consumption data is acquired from the power consumption measurement circuit by the microprocessor (rather than the application processor), and power consumption required for detecting the power consumption data may be reduced.

Figure 3:
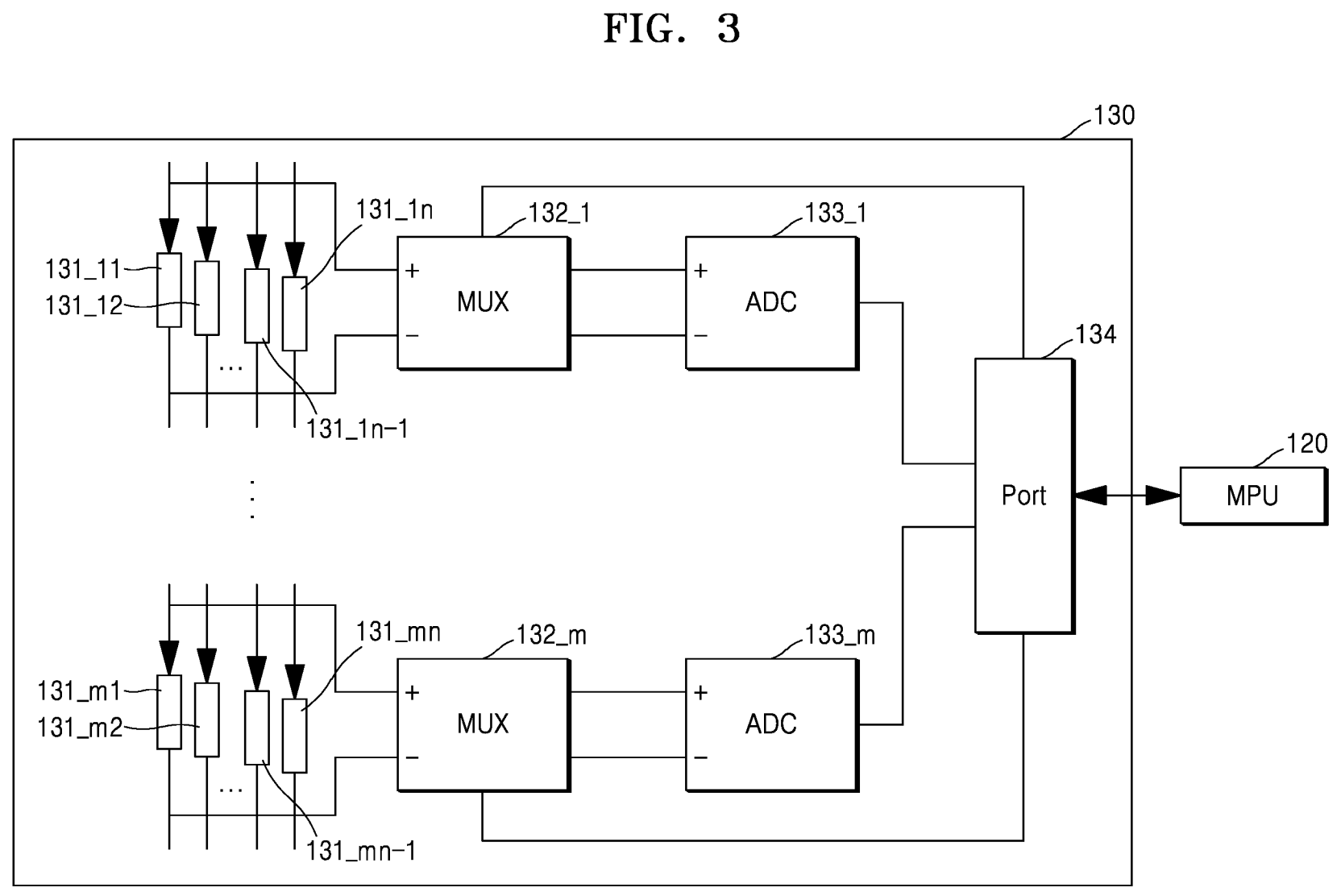

FIG. 3 is a block diagram showing a power consumption measurement circuit according to an example embodiment of the disclosure.

Referring to FIG. 3, the power consumption measurement circuit 130 may include a plurality of resistors 131_11 to 131__mn_, at least one MUX 132_1 to 132__m_, at least one ADC 133_1 to 133__m_ and a I/O port 134 (m is an integer greater than or equal to 1, and n is an integer greater than 1). However, the number of the resistors, the MUX and the ADC included in the power consumption measurement circuit 130 and connection relationships between the resistors, the MUX and the ADC may not be limited to the number of the resistors, the MUX and the ADC and the connection relationships between the resistors, the MUX and the ADC shown in FIG. 3.

According to one or more example embodiments, the power consumption measurement circuit 130 may receive, a command for controlling the at least one MUX 132_1 to 132__m_ and the at least one ADC 133_1 to 133__m_ to detect the power consumption data, from the MPU 120 through the I/O port 134. In addition, the power consumption measurement circuit 130 may transmit the detected power consumption data to the MPU 120 through the I/O port 134. For example, I/O port 134 may be a serial port, but is not limited thereto.

Each of the plurality of resistors 131_11 to 131__mn_ may be connected in series to a corresponding hardware module of the mobile terminal 100. For example, the resistor 131_11 may be connected to a first hardware module, for example, a hardware circuit performing an image capturing (or a photographing) function. For example, the plurality of resistors 131_11 to 131__mn_ may be current sensing resistors. For example, a resistance value of each of the plurality of resistors 131_11 to 131__mn_ may be one of 10 m $\Omega$ to 100 m $\Omega$.

The at least one MUX 132_1 to 132__m_ may be connected to the resistors 131_11 to 131__mn_, and the at least one ADC 133_1 to 133__m_ may be connected to the at least one MUX 132_1 to 132__m_ respectively.

According to one or more example embodiments, in order to acquire power consumption data corresponding to a target hardware module of the at least one hardware module, the MPU 120 may control a target MUX to connect a target ADC to a target resistor, and control the target ADC to detect voltage data corresponding to the target resistor. Here, the target resistor is a resistor connected to a target hardware module among the plurality of resistors, the target MUX is a MUX connected to the target resistor among the at least one MUX, and the target ADC is a ADC connected to the target MUX among the at least one ADC.

According to an example embodiment, in order to acquire power consumption data corresponding to a first hardware module, the MPU 120 may control the MUX 132_1 to connect the ADC 133_1 to the resistor 131_11, control the ADC 133_1 to detect voltage data corresponding to the resistor 131_11, and acquire the power consumption data corresponding to the first hardware module based on the voltage data corresponding to the resistor 131_11.

For example, the voltage data corresponding to the resistor 131_11 may include a first voltage difference between a first terminal and a second terminal of the resistor 131_11 and a second voltage difference between the first terminal of the resistor 131_11 and a ground terminal.

For example, ADC 133_1 may sample the first voltage difference between the first terminal and the second terminal of the resistor 131_11 and the second voltage difference between the first terminal of the resistor 131_11 and the ground terminal, to obtain the voltage data corresponding to the resistor 131_11. Here, the first terminal of the resistor 131_11 indicates a terminal, at which a voltage is higher, of two terminals of the resistor 131_11, and the second terminal of the resistor 131_11 indicates a terminal, at which a voltage is lower, of the two terminals of the resistor 131_11.

For example, the MPU 120 may determine the voltage data corresponding to the resistor 131_11 as the power consumption data corresponding to the first hardware module. For another example, the MPU 120 may calculate a power value based on the voltage data corresponding to the resistor 131_11 and the resistance value of the resistor 131_11, and determine the calculated power value as the power consumption data corresponding to the first hardware module.

In an example embodiment, the power consumption measurement circuit 130 may include a plurality of MUXs and a plurality of ADCs, the plurality of resistors may be divided into a plurality of resistor groups, and each MUX is connected to each resistor of a corresponding resistor group of the plurality of resistor groups and a corresponding ADC of the plurality of ADCs.

For example, the power consumption measurement circuit 130 may include a plurality of MUX 132_1 to 132_$m$ and a plurality of ADC 133_1 to 133_$m$. The plurality of resistors 131_11 to 131_$mn$ may be divided into a first resistor group to an m-th resistor group, and the first resistor group may include the resistors 131_11 to 131_1$n$, the second resistor group may include the resistors 131_21 to 131_2$n$, and the m-th resistor group may include the resistors 131_$m$1 to 131_$mn$. The MUX 132_1 may be connected to each resistor of the first resistor group and connected to the ADC 133_1, the MUX 132_2 may be connected to each resistor of the second resistor group and connected to the ADC 133_2, and the MUX 132_$m$ may be connected to each resistor of the m-th resistor group and connected to the ADC 133_$m$.

In another example embodiment, the power consumption measurement circuit 130 may include one MUX and one ADC, and the MUX may be connected between the plurality of resistors and the ADC.

According to one or more example embodiments, in order to detect voltage data corresponding to a plurality of resistors connected to a same MUX, the MPU 120 may detect voltage data corresponding to each of the plurality of resistors, by alternately connecting a corresponding ADC of the same MUX to the plurality of resistors through the same MUX.

For example, in order to detect voltage data corresponding to the plurality of resistors 131_11 to 131_1$n$ connected to the MUX 132_1, the MPU 120 may detect voltage data corresponding to each of the plurality of resistors 131_11 to 131_1$n$, by alternately connecting a corresponding ADC 133_1 of the MUX 132_1 to the plurality of resistors 131_11 to 131_1$n$ through the MUX 132_1.

It may be understood by those skilled in the art that any known method of measuring power consumption using the current sensing resistors may be used, which are not limited in the present application.

In the disclosure, by disposing the power consumption measurement circuit inside the mobile terminal, the power consumption of the mobile terminal may be measured without an external power consumption measure apparatus, thus, it may be convenient to measure the power consumption of the mobile terminals in batches, and it may be convenient to measure the power consumption of the mobile terminals in different test environments.

In the disclosure, by measuring the power consumption data corresponding to each hardware module of the mobile terminal, it may be easy to determine the hardware module with power consumption problems or the hardware module with high power consumption.

Figure 4:
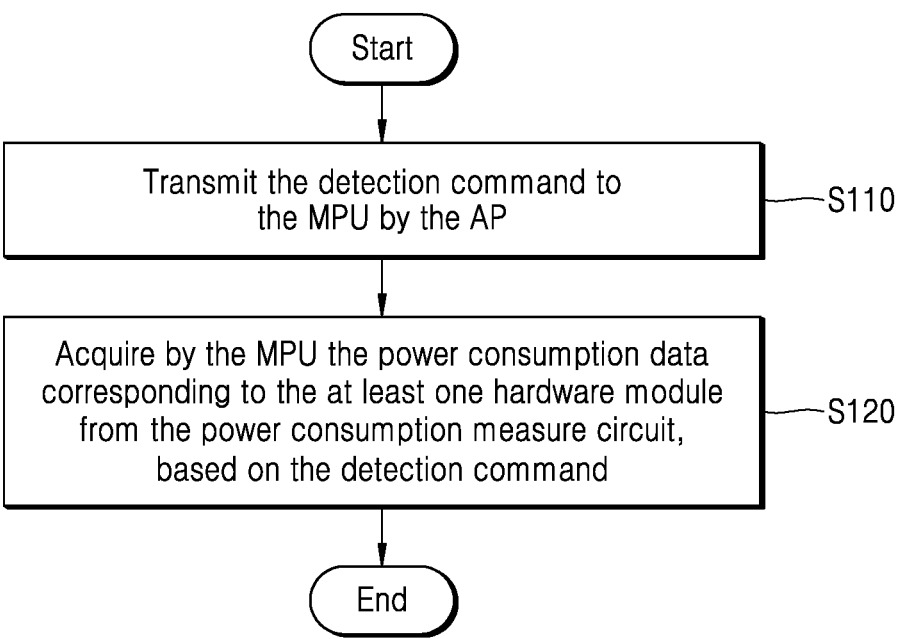
FIG. 4 is a flowchart showing a power consumption detection method of a mobile terminal according to an example embodiment of the disclosure.

FIG. 4 is a flowchart showing a power consumption detection method of a mobile terminal according to an example embodiment of the disclosure.

Referring to FIG. 4, in operation S110, a detection command for detecting power consumption data corresponding to at least one hardware module of a plurality of hardware modules of the mobile terminal 100 is transmitted by the AP 110. According to an example, the AP 110 may transmit a first detection command corresponding to a first hardware module and transmit a second detection command corresponding to a second hardware module. As such, the AP 110 may transmit a plurality of detections commands respectively corresponding to at least one hardware module of a plurality of hardware modules of the mobile terminal 100.

The AP 110 may generate the detection command based on the commands of the user or the preset parameters. According to an example, embodiment, the AP 110 may generate the detection command in response to the commands of the user or the preset parameters. For example, the detection command may include parameters for detecting the power consumption data, for example, a scene in which the power consumption data is detected, a frequency at which the power consumption data is detected, a duration during which the power consumption data is detected. However, the disclosure is not limited thereto, and as such, the parameter may include other criteria for detecting the power consumption data.

In operation S120, the power consumption data corresponding to the at least one hardware module is acquired, by the MPU 120, through the power consumption measurement circuit 130, based on the detection command received from the AP 110.

The MPU 120 may acquire the power consumption data corresponding to the at least one hardware module through the power consumption measurement circuit 130 in response to the detection command received from the AP 110. For example, the MPU 120 may control the power consumption measurement circuit 130 to acquire the power consumption data in a scene (for example, a sleep mode) indicated by the detection command. For example, the MPU 120 may control the power consumption measurement circuit 130 to acquire the power consumption data with the frequency parameter included in the detection command. For example, the MPU 120 may control the power consumption measurement circuit 130 to acquire the power consumption data according to the duration included in the detection command.

According to one or more example embodiments, the MPU 120 may temporarily store the power consumption data acquired through the power consumption measurement circuit in the memory 122 of the MPU 120 in the way of the circular buffer.

According to one or more example embodiments, the power consumption measurement circuit 130 may include a plurality of resistors, at least one MUX, and at least one ADC. Each resistor may be connected in series to a corresponding hardware module of the plurality of hardware modules, the at least one MUX may be connected to the plurality of resistors, and the at least one ADC may be connected to the at least one MUX respectively. The at least one ADC may detect voltage data corresponding to at least one resistor, connected to the at least one hardware module, among the plurality of resistors.

Here, voltage data corresponding to a resistor may include a first voltage difference between a first terminal and a second terminal of the resistor and a second voltage difference between the first terminal of the resistor and a ground terminal, wherein the first terminal of the resistor indicates a terminal, at which a voltage is higher, of the two terminals of the resistor, and the second terminal of the resistor indicates a terminal, at which a voltage is lower, of the two terminals of the resistor.

According to an example embodiment, power consumption data corresponding to a hardware module may be voltage data corresponding to a resistor connected to the hardware module, or a power value calculated based on the voltage data corresponding to the resistor connected to the hardware module and a resistance value of the resistor connected to the hardware module. In addition, the MPU 120 may transmit the power consumption data to a memory outside the mobile terminal through the AP 110.

According to an example embodiment, the MPU 120 may detect voltage data corresponding to a resistor connected to each hardware module by connecting a ADC to the resistor connected to each hardware module through a MUX, and obtain the power consumption data corresponding to each hardware module based on the voltage data corresponding to the resistor connected to each hardware module. Accordingly, the power consumption data corresponding to each hardware module of the at least one hardware module may be acquired.

In the case that the power consumption measurement circuit 130 includes a plurality of MUXs and a plurality of ADCs, the plurality of resistors may be divided into a plurality of resistor groups, and each MUX is connected to each resistor of a corresponding resistor group of the plurality of resistor groups and a corresponding ADC of the plurality of ADCs. In the case that the power consumption measurement circuit 130 includes one MUX and one ADC, the MUX is connected between the plurality of resistors and the ADC.

According to an example embodiment, in order to detect voltage data corresponding to a plurality of resistors connected to a same MUX, the MPU 120 may detect voltage data corresponding to each of the plurality of resistors, by alternately connecting a corresponding ADC of the same MUX to the plurality of resistors through the same MUX.

Figure 5:
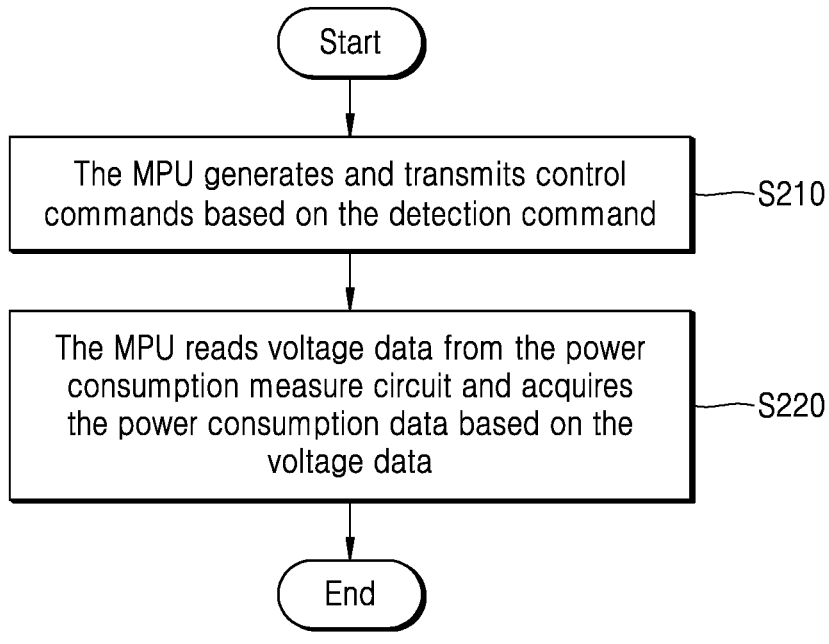
FIG. 5 is a flowchart of a microprocessor controlling a power consumption measurement circuit to acquire power consumption data according to an example embodiment of the disclosure.

FIG. 5 is a flowchart of a microprocessor controlling a power consumption measurement circuit to acquire the power consumption data according to an example embodiment of the disclosure.

In operation S210, the MPU 120 may generate control commands for controlling MUXs, ADCs and a port included in the power consumption measurement circuit 130 based on the detection command received from the AP 110, and transmit the control commands to the power consumption measurement circuit 130.

According to one or more example embodiments, the MPU 120 may generate a first control command based on information related to a hardware module to be detected indicated by the detection command. The first control command is used to control a target MUX to connect a target resistor to a target ADC and enable the target ADC. In other words, the information related to the hardware module to be detected contains information for determining the target resistor, the target MUX and the target ADC corresponding to the hardware module to be detected. Here, the target resistor is a resistor connected to the hardware module to be detected among the resistors of the power consumption measurement circuit, the target MUX is a MUX connected to the target resistor among the MUXs of the power consumption measurement circuit, and the target ADC is a ADC connected to the target MUX among the ADCs of the power consumption measurement circuit.

According to one or more example embodiments, the information related to the hardware module to be detected may include an identification of the target MUX, an identification of the target resistor, and an identification of the target ADC. In this case, the AP 110 may determine the identification of the target resistor, the identification of the target MUX and the identification of the target ADC corresponding to the identification of the hardware module to be detected, based on an identification of the hardware module to be detected included in the commands of the user or the preset parameters, based on a mapping table between the identification of the hardware module to be detected and the identification of the target resistor, the identification of the target MUX and the identification of the target ADC; and include or add, the determined identification of the target resistor, the determined identification of the target MUX and the determined identification of the target ADC as the information related to the hardware module to be detected, in or to the detection command. Or alternatively, the AP 100 may directly include or add, the identification of the target resistor, the identification of the target MUX and the identification of the target ADC corresponding to the identification of the hardware module to be detected included in the commands of the user or the preset parameters as the information related to the hardware module to be detected, in or to the detection command.

According to one or more example embodiments, the information related to the hardware module to be detected may include the identification of the hardware module to be detected. The MPU may determine the identification of the target resistor, the identification of the target MUX and the identification of the target ADC corresponding to the identification of the hardware module to be detected, based on the identification of the hardware module to be detected, based on the mapping table between the identification of the hardware module to be detected and the identification of the target resistor, the identification of the target MUX and the identification of the target ADC.

For example, when the hardware module to be detected is the first hardware module, the MPU 120 may generate the first control command for controlling the MUX 132_1 to connect the ADC 133_1 to the resistor 131_11 and enabling the ADC 133_1.

According to one or more example embodiments, the MPU 120 may transmit the first control command to the power consumption measurement circuit 130 in the scene indicated by the detection command. Alternatively, the MPU 120 may set a scene of the mobile terminal as the scene indicated by the detection command and transmit the first control command to the power consumption measurement circuit 130.

According to one or more example embodiments, the MPU 120 may generate and transmit the first control command at the frequency indicated by the detection command, so as to control the power consumption measurement circuit 130 to detect the power consumption data at the frequency indicated by the detection command.

According to one or more example embodiments, the MPU 120 may generate a second control command for disabling the target ADC after controlling the power consumption measurement circuit 130 to detect the power consumption data for the duration based on the duration indicated by the detection command. Alternatively, the MPU

120 may generate the second control command based on the stop command received from the AP 110.

In operation S220, the MPU 120 may read voltage data from the power consumption measurement circuit 130 and obtain the power consumption data based on the voltage data.

According to one or more example embodiments, the MPU 120 may read the voltage data from the target ADC through the I/O port 134.

For example, the MPU 120 may read the voltage data from the target ADC at the frequency indicated by the detection command.

For example, the MPU 120 may stop reading the voltage data after reading the voltage data from the target ADC for the duration indicated by the detection command. Alternatively, the MPU 120 may stop reading the voltage data after receiving the stop command from the AP 110.

According to one or more example embodiments, the MPU 120 may determine the voltage data read from the target ADC as the power consumption data corresponding to the hardware module to be detected. Alternatively, the MPU 120 may calculate a power value based on the voltage data read from the target ADC and a resistance value of the target resistor, and determine the calculated power value as the power consumption data corresponding to the hardware module to be detected.

Figure 6:
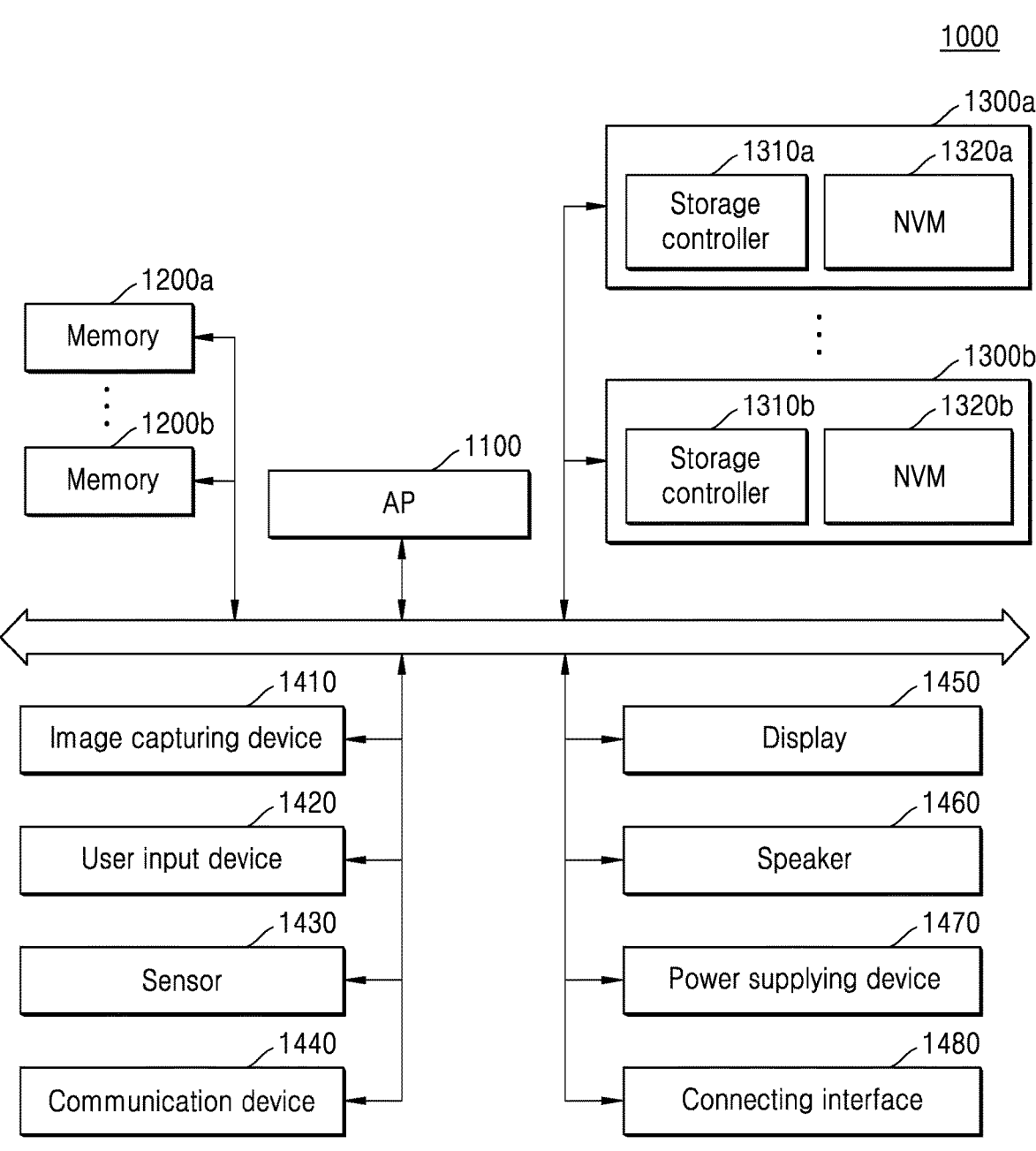
FIG. 6 is a diagram of a mobile terminal according to another example embodiment.

FIG. 6 is a diagram of a mobile terminal according to another example embodiment. The mobile terminal 1000 of FIG. 6 may basically be a mobile system, such as a portable communication terminal (e.g., a mobile phone), a smartphone, a tablet personal computer (PC), a wearable device, a healthcare device, or an Internet of things (IoT) device. However, the mobile terminal 1000 of FIG. 6 is not necessarily limited thereto and may be a laptop computer, a server, a media player, or an automotive device (e.g., a navigation device).

Referring to FIG. 6, the mobile terminal 1000 may include an AP 1100, memories (e.g., 1200a and 1200b), and storage devices (e.g., 1300a and 1300b). In addition, the mobile terminal 1000 may include at least one of an image capturing device 1410, a user input device 1420, a sensor 1430, a communication device 1440, a display 1450, a speaker 1460, a power supplying device 1470, and a connecting interface 1480.

The AP 1100 may control all operations of the mobile terminal 1000, more specifically, operations of other components included in the mobile terminal 1000. The AP 1100 may be replaced with a general-purpose processor, a dedicated processor, or the like. In addition, the mobile terminal 1000 may further include a microprocessor (e.g., a microprocessor described with reference to FIG. 2) and a power consumption measurement circuit (e.g., a power consumption measurement circuit described with reference to FIG. 3). Thus, the mobile terminal 1000 may be an apparatus that may detect its own power consumption data.

The AP 1100 may control the memories 1200a and 1200b and/or the storage devices 1300a and 1300b.

The memories 1200a and 1200b may be used as main memory devices of the mobile terminal 1000. Although each of the memories 1200a and 1200b may include a volatile memory, such as static random access memory (SRAM) and/or dynamic RAM (DRAM), each of the memories 1200a and 1200b may include non-volatile memory, such as a flash memory, phase-change RAM (PRAM) and/or resistive RAM (RRAM). The memories 1200a and 1200b may be implemented in the same package as the AP 1100.

The storage devices 1300a and 1300b may serve as non-volatile storage devices configured to store data regardless of whether power is supplied thereto, and have larger storage capacity than the memories 1200a and 1200b. The storage devices 1300a and 1300b may respectively include storage controllers 1310a and 1310b (STRG CTRL) and NVMs 1320a and 1320b (Non-Volatile Memory) configured to store data via the control of the storage controllers 1310a and 1310b. Although the NVMs 1320a and 1320b may include flash memories having a two-dimensional (2D) structure or a three-dimensional (3D) V-NAND structure, the NVMs 1320a and 1320b may include other types of NVMs, such as PRAM and/or RRAM.

The storage devices 1300a and 1300b may be physically separated from the AP 1100 and included in the mobile terminal 1000 or implemented in the same package as the AP 1100. In addition, the storage devices 1300a and 1300b may have types of solid-state devices (SSDs) or memory cards and be removably combined with other components of the memory system 100 through an interface, such as the connecting interface 1480 that will be described below. The storage devices 1300a and 1300b may be devices to which a standard protocol, such as a universal flash storage (UFS), an embedded multi-media card (eMMC), or a non-volatile memory express (NVMe), is applied, without being limited thereto.

The image capturing device 1410 may capture still images or moving images. The image capturing device 1410 may include a camera, a camcorder, and/or a webcam.

The user input device 1420 may receive various types of data input by a user of the mobile terminal 1000 and include a touch pad, a keypad, a keyboard, a mouse, and a microphone.

The sensor 1430 may detect various types of physical quantities, which may be obtained from the outside of the mobile terminal 1000, and convert the detected physical quantities into electric signals. The sensor 1430 may include a temperature sensor, a pressure sensor, an illuminance sensor, a position sensor, an acceleration sensor, a biosensor, and/or a gyroscope sensor.

The communication device 1440 may be used for wired or wireless communication with the outside.

The display 1450 and the speaker 1460 may serve as output devices configured to respectively output visual information and auditory information to the user of the mobile terminal 1000.

The power supplying device 1470 may appropriately convert power supplied from a battery embedded in the mobile terminal 1000 and/or an external power source, and supply the converted power to each of components of the mobile terminal 1000.

The connecting interface 1480 may provide connection between the mobile terminal 1000 and an external device, which is connected to the mobile terminal 1000 and capable of transmitting and receiving data to and from the mobile terminal 1000. The connecting interface 1480 may be implemented by using various interface schemes, such as High Definition Multimedia Interface (HDMI), advanced technology attachment (ATA), serial ATA (SATA), external SATA (e-SATA), small computer system interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

The apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card or a micro card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent to one of ordinary skill in the art that various changes in form and details may be made in these examples without departing from the spirit and scope of the claims and their equivalents.

What is claimed is:

1. A mobile terminal, comprising:
   a power consumption measurement circuit configured to measure power consumption of one or more hardware modules, among a plurality of hardware modules of the mobile terminal;
   an application processor configured to transmit a detection command for detecting power consumption of a first hardware module, among the plurality of hardware modules; and
   a microprocessor configured to obtain first power consumption data corresponding to the first hardware module from the power consumption measurement circuit, based on the detection command received from the application processor, wherein the power consumption measurement circuit comprises:

a plurality of resistors respectively connected to the plurality of hardware modules;

at least one multiplexer (MUX) connected to the plurality of resistors; and at least one analog-to-digital converter (ADC) respectively connected to the at least one MUX, and configured to detect first voltage data corresponding to a first resistor connected to the first hardware module, from among the plurality of resistors.

2. The mobile terminal of claim 1, wherein the first power consumption data comprises the first voltage data corresponding to the first resistor connected to the first hardware module, or a power value obtained based on the first voltage data corresponding to the first resistor connected to the first hardware module and a resistance value of the first resistor connected to the first hardware module.

3. The mobile terminal of claim 1, wherein the obtaining of the first power consumption data corresponding to the first hardware module from the power consumption measurement circuit comprises: detecting voltage data corresponding to a target resistor by connecting a target ADC to the target resistor through a target MUX, and wherein the target resistor is a first resistor connected to the first hardware module among the plurality of resistors, the target MUX is a first MUX connected to the target resistor among the at least one MUX, and the target ADC is a first ADC connected to the target MUX among the at least one ADC.

4. The mobile terminal of claim 3, wherein the power consumption measurement circuit comprises a plurality of MUXs and a plurality of ADCs, wherein the plurality of resistors are divided into a plurality of resistor groups, and wherein each MUX, among the plurality of MUXs, is connected to each resistor of a corresponding resistor group of the plurality of resistor groups and a corresponding ADC of the plurality of ADCs.

5. The mobile terminal of claim 3, wherein voltage data corresponding to each of a plurality of target resistors is detected by alternately connecting a corresponding ADC of a same target MUX to the plurality of target resistors through the same target MUX.

6. The mobile terminal of claim 1, wherein each of the plurality of resistors is connected in series between a power supply for supplying power to a corresponding hardware module of the plurality of hardware modules and a power interface of the corresponding hardware module.

7. The mobile terminal of claim 1, wherein voltage data corresponding to each of the plurality of resistors comprises a voltage difference between a first terminal and a second terminal of each of the plurality of resistors, and a voltage difference between the first terminal of each of the plurality of resistors and a ground terminal, wherein the first terminal of each of the plurality of resistors indicates a terminal, at which a voltage is higher, of two terminals of the resistor, and the second terminal of each of plurality of resistors indicates a terminal, at which a voltage is lower, of the two terminals of the resistor.

8. The mobile terminal of claim 1, wherein the microprocessor is further configured to transmit the first power consumption data to an external device outside the mobile terminal through the application processor.

9. The mobile terminal of claim 1, wherein the application processor and the microprocessor are independent processors.

10. The mobile terminal of claim 1, wherein the microprocessor comprises a memory configured to store the first power consumption data.

11. The mobile terminal of claim 10, wherein the microprocessor is further configured to:

transmit a transmission command to the application processor based on a size of the first power consumption data stored in the memory being greater than a first threshold amount; and transmit the transmission command to the application processor based on receiving a command to stop detection of the first power consumption data.

12. The mobile terminal of claim 11, wherein the application processor is further configured to transmit the first power consumption data stored in the memory to a memory outside the mobile terminal based on the transmission command.

13. The mobile terminal of claim 10, wherein the microprocessor is further configured to:

based on the application processor entering a sleep mode, continue to acquire the first power consumption data; and based on a remaining storage capacity of the memory being less than a second threshold amount, wake up the application processor and transmit a transmission command to the application processor.

14. A power consumption detection method of a mobile terminal, the mobile terminal comprising an application processor, a microprocessor and a power consumption measurement circuit, the power consumption detection method comprising:

transmitting, by the application processor, a detection command for detecting power consumption of a first hardware module of a plurality of hardware modules of the mobile terminal; and obtaining, by the microprocessor, first power consumption data corresponding to the first hardware module from the power consumption measurement circuit, based on the detection command received from the application processor, wherein the power consumption measurement circuit includes a plurality of resistors respectively connected to the plurality of hardware modules, at least one multiplexer (MUX) connected to the plurality of resistors, and at least one analog-to-digital converter (ADC) respectively connected to the at least one MUX, and wherein the obtaining the first power consumption data corresponding to the first hardware module from the power consumption measurement circuit comprises detecting first voltage data corresponding to a first resistor, connected to the first hardware module, among the plurality of resistors by the at least one ADC.

15. The power consumption detection method of claim 14, wherein the first power consumption data comprises the first voltage data corresponding to the first resistor connected to the first hardware module, or a power value obtained based on the first voltage data corresponding to the first resistor connected to the first hardware module and a resistance value of the first resistor connected to the first hardware module.

16. The power consumption detection method of claim 14, the obtaining the first power consumption data corresponding to the first hardware module through the power consumption measurement circuit comprises detecting voltage data corresponding to a target resistor by connecting a target ADC to the target resistor through a target MUX, wherein the target resistor is the first resistor connected to the first hardware module among the plurality of resistors, the target MUX is a first MUX connected to the target resistor among the at least one MUX, and the target ADC is a first ADC connected to the target MUX among the at least one ADC.

17. The power consumption detection method of claim 16, wherein the power consumption measurement circuit comprises a plurality of MUXs and a plurality of ADCs, wherein the plurality of resistors are divided into a plurality of resistor groups, and wherein each MUX, among the plurality of MUXs, is connected to each resistor of a corresponding resistor group of the plurality of resistor groups and a corresponding ADC of the plurality of ADCs.

18. The power consumption detection method of claim 16, wherein the detecting the first voltage data corresponding to the target resistor comprises detecting voltage data corresponding to each of a plurality of target resistors, by alternately connecting a corresponding ADC of a same target MUX to the plurality of target resistors through the same target MUX.

* * * * *